United States Patent
Döbele

(10) Patent No.: US 7,461,568 B2
(45) Date of Patent: Dec. 9, 2008

(54) DRIVE DEVICE COMPRISING A GEARBOX

(75) Inventor: Bernd Döbele, Salem (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 338 days.

(21) Appl. No.: 10/584,797

(22) PCT Filed: Dec. 14, 2004

(86) PCT No.: PCT/EP2004/014204

§ 371 (c)(1),
(2), (4) Date: Jun. 28, 2006

(87) PCT Pub. No.: WO2005/068879

PCT Pub. Date: Jul. 28, 2005

(65) Prior Publication Data

US 2007/0150150 A1     Jun. 28, 2007

(30) Foreign Application Priority Data

Jan. 16, 2004     (DE) ................. 10 2004 002 283

(51) Int. Cl.
*F16H 3/08* (2006.01)
(52) U.S. Cl. ........................................... 74/331
(58) Field of Classification Search ............... 74/333, 74/331
See application file for complete search history.

(56) References Cited

U.S. PATENT DOCUMENTS

| | | | |
|---|---|---|---|
| 3,527,119 A * | 9/1970 | Nasvytis | 475/218 |
| 4,261,216 A | 4/1981 | Braun | |
| 4,544,057 A | 10/1985 | Webster et al. | |
| 4,583,426 A | 4/1986 | Chassagnette et al. | |
| RE33,126 E * | 12/1989 | Wittke | 475/218 |
| 5,030,179 A * | 7/1991 | Ganoung | 475/50 |
| 6,095,001 A | 8/2000 | Ruehle et al. | |
| 7,070,534 B2 * | 7/2006 | Pelouch | 475/214 |

FOREIGN PATENT DOCUMENTS

| | | |
|---|---|---|
| DE | 958 081 | 2/1957 |
| DE | 196 52 916 A1 | 6/1998 |
| DE | 198 44 783 C1 | 3/2000 |
| EP | 0 933 558 A1 | 8/1999 |
| EP | 1 096 172 A2 | 5/2001 |
| EP | 1 190 887 A2 | 3/2002 |
| EP | 1 251 296 A2 | 10/2002 |
| FR | 2 831 234 | 4/2003 |
| GB | 632861 | 12/1949 |

* cited by examiner

*Primary Examiner*—Dirk Wright
(74) *Attorney, Agent, or Firm*—Davis Bujold & Daniels, P.L.L.C.

(57) ABSTRACT

A drive device for a transmission (4), a main engine and a shifting clutch (3). In order to reduce the phase of tractive force interruption during switching operations, the drive device has a shifting brake clutch (9), located between the engine and the shifting clutch, such that during switching operations, intersecting disengaging and engaging processes of both clutches (3 or 9), provide for support of the main engine torque in a gear output (5).

7 Claims, 2 Drawing Sheets

DRIVE DEVICE COMPRISING A GEARBOX

This application is a national stage completion of PCT/EP2004/014204 filed Dec. 14, 2004 which claims priority from German Application Ser. No. 10 2004 002 283.6 filed Jan. 16, 2004.

FIELD OF THE INVENTION

The invention concerns a drive device with a transmission.

BACKGROUND OF THE INVENTION

Drive devices with a transmission and, for example, a main engine designed as an internal combustion engine, are generally known in vehicle construction. With such drive devices, the main engine is actively connected with a drive shaft which, on its part, starts the input side of a shifting clutch assigned to the transmission. The output of this shifting clutch is then connected drive-technically with the input shaft of the transmission, whose output acts upon the vehicle wheels being propelled via a differential gear.

As a rule, such transmissions are designed as multi-step transmissions with whose operation it comes to a tractive force interruption with the gear change, which incidentally also is true for the so-called automated multi-step transmissions. From this generally ensues the demand to keep the phases of the tractive force interruption as short as possible in terms of increased driving comfort.

With the gearshift of a synchronized transmission this time has already been shortened through an increase in the operating force as well as an increase of the performance capability of the synchronizer meshes. With unsynchronized transmissions in this regard a corresponding design of a so-called clutch brake has become known.

Since the shifting clutch is opened with synchronized transmissions with shifting operations between the main engine and transmission generally, and with unsynchronized transmissions with an upward gearshift, with the achieved shortening of the tractive force interruption, thus the shortening of the time span for the mechanical gear change, the problem increasingly arises of reducing the currently existing revolution speed difference at the conclusion of the gear change via the shifting clutch without losses in comfort as well as at the same time wear resistant clashing with the clutch and main engine torque.

It would be offered as the path to a solution of this problem, to first begin with the closing procedure of the shifting clutch, when the two revolution speeds, adjacent to the shifting clutch, have converged as far as possible. These measures, however, run contrary to the already achieved shortening of the time for the mechanical gear change.

Against this background, the task, which underlies the invention, is to design a drive device with a transmission, such that the time span for the tractive force interruption with a gear change is further minimized and the breakdown in the tractive force is reduced.

SUMMARY OF THE INVENTION

The invention envisions that a shifting brake clutch is ordered in the performance transmission path of the main engine to the transmission between the driveline and the shifting clutch, and that the output of the shifting brake clutch can be brought into active connection with the gear output.

This has the advantage that through the interplay of the shifting clutch and the shifting brake clutch, the decrease in tractive force, typically due to the opening phase of the shifting clutch, is connected via the active connection of the shifting brake clutch with the gear output, i.e., the main engine torque supports itself in this phase in the transmission output. With a gear change, the two clutches operate in an intersecting manner whereby the main engine torque is advantageously reduced through the torque support to a transferable degree by the shifting brake clutch.

With a gearshift up to the next higher gear, a sinking of the main engine revolution speed is thus successfully achieved by that amount, which ensues from the revolution speed change of the gear change, under simultaneous support of the torque in the transmission output. With the drive device, according to the invention, both the complete collapse of the tractive force transmission occurring typically in the drive devices, according to the state of the art, is thus prevented and the time span is clearly lessened with reduced tractive force.

In a favorable manner, an otherwise usual transmission brake, as known for example from DE 196 52 916 A1, can be dispensed with.

Preferably it is provided that the support torque is received, via an auxiliary shaft propellable by the shifting brake clutch, which transfers this torque to the gear output in a torque path preferably parallel to the transmission.

In the advantageous design of this invention, the location of the torque discharge in this gear output can be designed switchably for the further increase of the torque in the gear output. For this purpose, idle gears can preferably be ordered to the auxiliary shaft, which are optionally and alternately connectable to the gear output by way of a coupling mechanism. In doing so, a secondary switching group is ordered to the transmission, for example, in the form of a planetary gear stage. The gear output shaft ordered directly to the transmission is thereby actively connected to the planetary gear stage, whose output in the form of a main output shaft, for example, drives the cardan shaft of a vehicle designed with this drive device via a differential gear.

In the concrete design of the invention, in particular, it can be provided that the output of the shifting brake clutch is rotationally fixed with an idle gear, which is rotationally fixed on the drive shaft. This idle gear preferably meshes with an intermediate wheel mounted on the gear housing which, moreover, is engaged with a fixed wheel on the auxiliary shaft.

Preferably, at least two idle gears are assigned to the output of the auxiliary shaft, which are mounted on these and are combinable optionally and alternately with a mechanical coupling mechanism with the gear output. This coupling mechanism is designed, for example, as a sliding collar.

Furthermore with this drive device, it is provided that the idle gear close to the transmission meshes with another idle gear, which is engaged with a gear wheel attached to the gear output shaft of the transmission. The idle gear distant from the transmission combs, in contrast, with an intermediate wheel, which is engaged with a gear wheel attached to the main output shaft of the drive device.

Another study of the invention provides that the gear output shaft of the transmission is actively connected with the input of a secondary switching group, whose output is formed by the main output shaft.

In this connection, it can be provided that the intermediate wheel, which meshes with the gear wheel attached to the main drive shaft, is a planetary wheel of a secondary switching stage designed as a planetary gear.

BRIEF DESCRIPTION OF THE DRAWINGS

The invention will now be described, by way of example, with reference to the accompanying drawings in which.

DETAILED DESCRIPTION OF THE INVENTION

Figure 1:
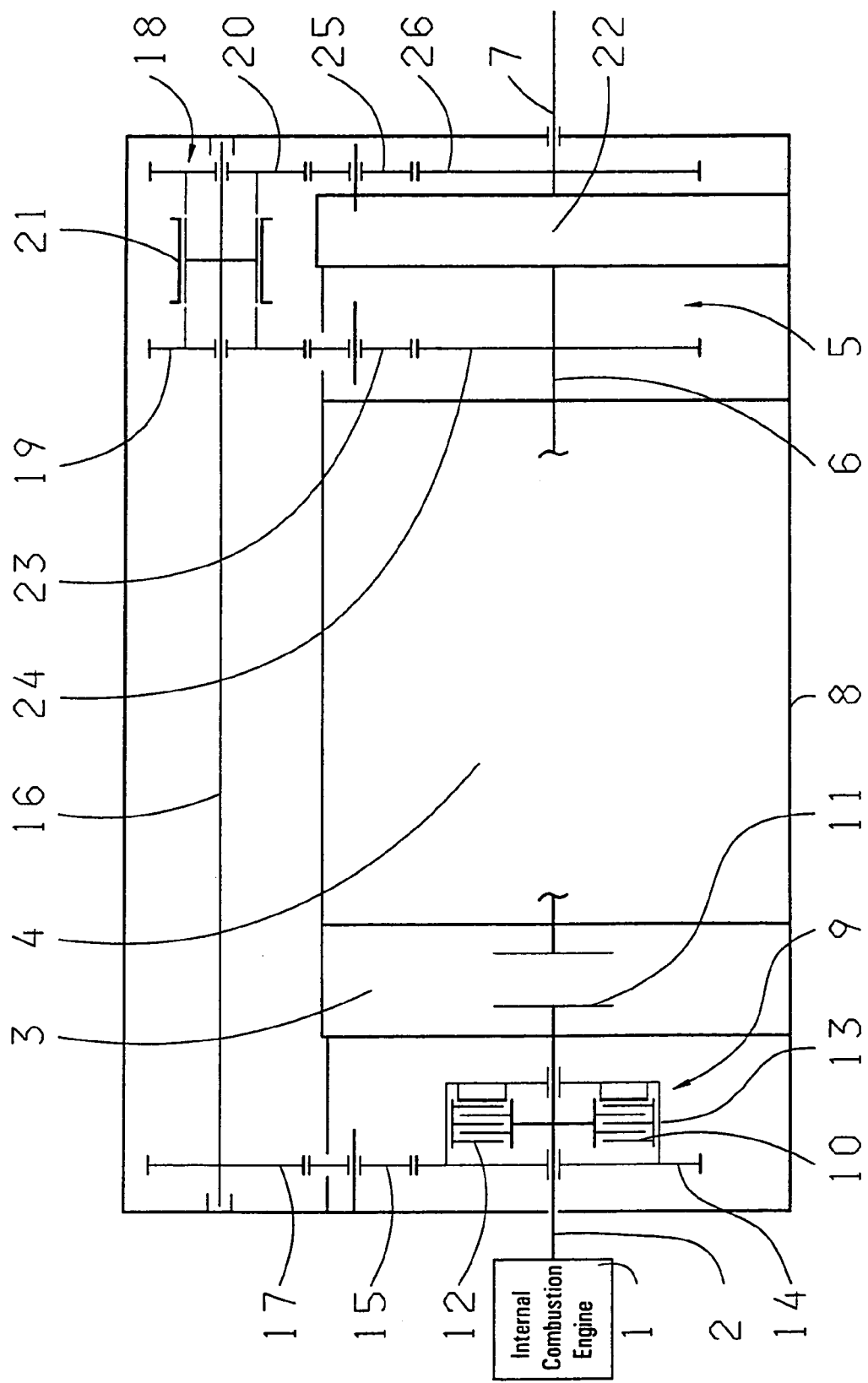
FIG. 1 shows a schematic structural view of the drive device according to the invention.

In FIG. 1, a main engine is discernible and designed as an internal combustion engine 1, which relays its torque by way of a drive shaft 2 on the input side of a shifting clutch 3. This, in turn, is assigned to a transmission 4 or also a main gear drive, which shows a known construction and thus not shown in more detail here. Such a transmission can also be designed as an automated transmission. A gear output 5, in addition, shows a gear output shaft 6 and a main output shaft 7.

These specified units are structurally unified inside a housing 8 with the exception of the internal combustion engine 1. Between the drive shaft 2 and the shifting clutch 3, serving also as a start-up clutch, a shifting brake clutch 9 is arranged, whereby the drive shaft 2 permanently drives a radial inner disk pact 10 of the shifting brake clutch 9. The drive shaft 2 is executed axially by the shifting brake clutch 9 and acts permanently on an input-sided clutch surface 11 of the shifting clutch 3.

A radial external disk pack 12 of the shifting brake clutch 9 is radially fixed in a clutch housing 13, which drives a co-axial gear wheel 14 ordered to the drive shaft 2. This gear wheel 14 is engaged with an intermediate wheel 15 supported in the housing 8, which meshes with a torque proof drive wheel 17 ordered to an auxiliary shaft 16. This auxiliary shaft 16 is radially fixed in the housing 8.

At the end of the auxiliary shaft 16 opposite the drive wheel 17, an output 18 is assigned to the gear output 5. For this purpose, two idle gears 19, 20 are mounted on the auxiliary shaft 16. A coupler mechanism 21 rotationally fixed in an axially moveable manner with the auxiliary shaft 16 can be brought optionally or alternately into engagement with one of the idle gears 19, 20.

A secondary switching group 22, designed as a planetary wheel stage, is arranged between the gear output shaft 6 and the main output shaft 7. The idle gear 19, arranged in this example to the left next to the coupling mechanism 21, engages an intermediate wheel 23 which, on its side, meshes with a slip free gear wheel 24 ordered to the gear output shaft 6, while the other idle gear 20 is engaged via an intermediate wheel 25 with a slip free gear wheel 26 ordered to the main output shaft 7. The intermediate wheel 25 is preferably a planetary wheel of the planetary wheel stage.

The operating mode of the drive device now follows:

In the running internal combustion engine 1, the opened shifting brake clutch 9, and the closed shifting clutch 3, the drive performance of the drive shaft 2 is transferred via the shifting clutch 3 to the transmission 4 and from there, after the torque conversion, via the gear output shaft 6 is stamped on a solar wheel of the secondary switching group 22 (not shown). The output from the secondary switching group 22 on the main output shaft 7 occurs via the intermediate wheel 25.

In the case of a gear change in the transmission 4 to a higher gear, the following takes place. While the shifting clutch 3 opens, the shifting brake clutch 9 approaches in an intersecting manner, whereby it comes to a friction force transfer within the shifting brake clutch 9 and, as a result, a torque flow occurs via the auxiliary shaft 16. Either the idle gear 19 or the idle gear 20 is launched via the coupling mechanism 21 in the output 18 of the auxiliary shaft 16. In both cases, the torque, adjacent to the auxiliary shaft 16, supports itself in the gear output 5. Through this, the main engine torque is reduced and the revolution speed of the drive shaft 2 is reduced by that amount, which corresponds to the revolution speed change from the current gear transition.

With the completion of the switching operation, the self-closing startup clutch 3, intersecting with the opening shifting brake clutch 9, undertakes the main engine torque such that, after the completion of the switching operation, the whole torque flow occurs in the by-passing of the auxiliary shaft 16.

Figure 2:
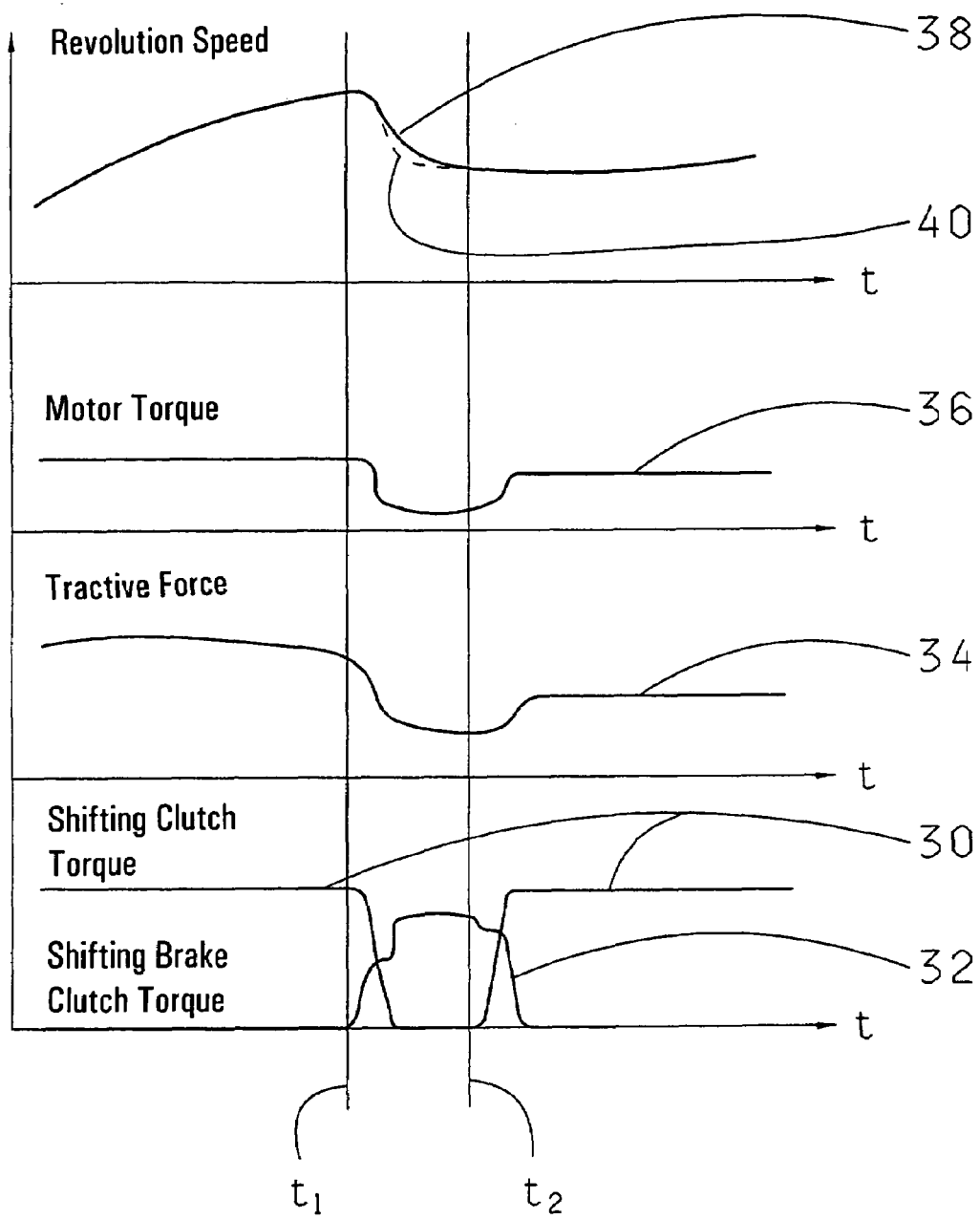
FIG. 2 is a qualitative course of different parameters of the drive chain according to FIG. 1 over time.

For clarification of the connections, the processes with respect to time of some magnitudes relevant to the drive device are represented relative. to one another in FIG. 2.

In the horizontal axis, the time t is plotted respectively, whereby the points in time t1 or t2 represent the beginning or the end of a mechanical gear change process.

Starting from the bottom in FIG. 2, initially the process of the torque led via the shifting clutch 3 with a curve 30 and the corresponding torque, via the shifting brake clutch 9 with a curve 32, are represented. Clearly visible is the intersection phase lying between t1 and t2 of both clutches 3, 9.

Up to the point in time t1, at the start of the mechanical switching operation, the torque flow occurs via the closed shifting clutch 3, whose transferred torque after the point in time t1 is reduced by a steered, slip-afflicted opening up to a value equal to or approaching zero. Nearly to the same degree, the shifting brake clutch 9 undertakes a rising torque through a steered, slip-afflicted approach. At the point in time t2, at the end of the mechanical switching operation, the shifting clutch 3 undertakes torque again, while the torque transferred via the shifting brake clutch 9 is reduced.

Curve 34, shown lying above it in FIG. 2, portrays the process of tractive force, while curve 36 reflects the process of the internal combustion engine torque.

Curves 38 or 40 portray the process of the main engine torque or the transmission torque in the case of a shift upwards, whereby the process of curve 40 is marked by way of dashes. Only in the time interval between the points in time t1 and t2 do these two curves 38, 40 deviate from one another.

From the process of curve 34, it is readily discernible that the tractive force is indeed diminished by the intersection of the torque processes 30 and 32, but advantageously does not completely collapse.

REFERENCE NUMERALS 1 internal combustion engine
2 drive shaft
3 shifting clutch
4 transmission
5 gear output
6 gear output shaft
7 main output shaft
8 housing
9 shifting brake clutch
10 disk pack
11 clutch surface
12 disk pack
13 clutch housing
14 gear wheel
15 intermediate wheel
16 auxiliary shaft
17 drive wheel
18 output
19 idle gear 20 idle gear
21 coupler mechanism
22 secondary switching group
23 intermediate wheel
24 gear wheel
25 intermediate wheel
26 gear wheel
30 shifting clutch torque curve
32 shifting brake clutch torque curve
34 tractive force curve
36 internal combustion engine torque curve
38 main engine revolution speed curve
40 transmission revolution speed curve
t time
t1 point in time
t2 point in time

The invention claimed is:

1. A drive device with a transmission (4), the drive device comprising:
- a drive shaft (2) being directly connected with an engine;
- a shifting clutch (3) being located between the drive shaft (2) and an input shaft of the transmission (4), and the shifting clutch (3) detachably coupling the drive shaft (2) with a gear output (5) coupled to an output of the transmission;
- a shifting brake clutch (9) being located between the drive shaft (2) and the shifting clutch (3), and an output of the shifting brake clutch (9) being selectively combinable with the gear output (5);
- the output of the shifting brake clutch (9) driving an auxiliary shaft (16) and an output from the auxiliary shaft (16) driving an output (18, 19) which drives the gear output (5);
- a coaxial gear wheel (14), which is mounted on the drive shaft (2), forming the output of the shifting brake clutch (9); and
- at least two idle gears (19, 20), mounted on the auxiliary shaft (16) and coupled with the output (18, 19) of the auxiliary shaft (16), being optionally and alternately combinable with the gear output (5) via a coupling mechanism (21);
- wherein the coaxial gear wheel (14) meshes with an intermediate wheel (15) which engages with a fixed wheel (17) supported by the auxiliary shaft (16).

2. The drive device according to claim 1, wherein the coaxial gear wheel (14), the intermediate wheel (15) and the fixed wheel (17) are mounted in a gear housing (8).

3. A drive device with a transmission (4), the drive device comprising:
- a drive shaft (2) being directly connected with an engine;
- a shifting clutch (3) being located between the drive shaft (2) and an input shaft of the transmission (4), and the shifting clutch (3) detachably coupling the drive shaft (2) with a gear output (5) which is coupled to an output of the transmission;
- a shifting brake clutch (9) being located between the drive shaft (2) and the shifting clutch (3) and an output of the shifting brake clutch (9) being selectively combinable with the gear output(5);
- a coaxial gear wheel (14), which is mounted on the drive shaft (2), forming the output of the shifting brake clutch (9); and
- at least two idle gears (19, 20) being mounted on the auxilliary shaft (16) and each of the at least two idle gears (19, 20) being optionally and alternately combinable with the gear output (5) via a coupling mechanism (21);
- wherein a first of the at least two idle gears (19) is located closer to the transmission (4) than a second of the at least two idle gears (20) and meshes with a further idle gear (23) which engages a gear wheel (24) located on a gear output shaft (6) of the transmission (4).

4. A drive device with a transmission (4), the drive device comprising:
- a drive shaft (2) being directly connected with an engine;
- a shifting clutch (3) being located between the drive shaft (2) and an input shaft of the transmission (4), and the shifting clutch (3) detachably coupling the drive shaft (2) with a gear output (5) which is coupled to an output of the transmission;
- a shifting brake clutch (9) being located between the drive shaft (2) and the shifting clutch (3), and an output of the shifting brake clutch (9) being selectively combinable with the gear output (5);
- a coaxial gear wheel (14), which is mounted on the drive shaft (2), forming the output of the shifting brake clutch (9); and
- at least two idle gears (19, 20) being mounted on the auxiliary shaft (16) and each of the least two idle gears (19, 20) being optionally and alternately combinable with the gear output (5) via a coupling mechanism (21);
- wherein a second of the at least two idle gears(20) is located further from the transmission (4) than a first of the at least two idle gears (19) and meshes with an intermediate wheel (25) which engages a gear wheel (26) attached to a main output shaft (7) of the drive device.

5. The drive device pursuant to claim 1, wherein the gear output (5) actively communicates with an input of a secondary switching group (22) whose output is formed by a main output shaft (7).

6. The drive device according to claim 1, wherein an intermediate wheel (25) meshes with a gear wheel (26) which is attached to a main output shaft (7), and the main output shaft (7) is a planetary wheel of a secondary switching stage (22) and the secondary switching stage (22) is a planetary gear.

7. The drive device according to claim 1, wherein the auxilliary shaft (16) is mounted in a gear housing (8), and the coupling mechanism (21), on the output side, is a sliding collar.

* * * * *